(12) United States Patent
Bieger et al.

(10) Patent No.: US 10,661,652 B2
(45) Date of Patent: May 26, 2020

(54) VEHICLE MULTIMEDIA DEVICE

(71) Applicant: Continental Automotive GmbH, Hannover (DE)

(72) Inventors: Stefan Bieger, Nidda (DE); Gerhard Dochow, Wetzlar (DE)

(73) Assignee: Continental Automotive GmbH, Hannover (DE)

( * ) Notice: Subject to any disclaimer, the term of this patent is extended or adjusted under 35 U.S.C. 154(b) by 26 days.

(21) Appl. No.: 15/517,265

(22) PCT Filed: Oct. 8, 2015

(86) PCT No.: PCT/EP2015/073265
§ 371 (c)(1),
(2) Date: Apr. 6, 2017

(87) PCT Pub. No.: WO2016/055571
PCT Pub. Date: Apr. 14, 2016

(65) Prior Publication Data
US 2017/0305271 A1    Oct. 26, 2017

(30) Foreign Application Priority Data
Oct. 9, 2014   (DE) ........................ 10 2014 220 535

(51) Int. Cl.
*G06F 21/64* (2013.01)
*B60K 35/00* (2006.01)
(Continued)

(52) U.S. Cl.
CPC .............. *B60K 35/00* (2013.01); *B60K 37/06* (2013.01); *G06F 21/64* (2013.01); *G06F 21/74* (2013.01);
(Continued)

(58) Field of Classification Search
CPC ........ H01G 11/62; H01G 11/64; H01G 11/28; H01M 10/0567; H01M 10/0569;
(Continued)

(56) References Cited

U.S. PATENT DOCUMENTS 6,275,585 B1 *  8/2001  Ablay .................... G01C 21/26
                                                           380/2
2003/0147534 A1 *  8/2003  Ablay ................... H04L 9/3271
                                                         380/270
(Continued)

FOREIGN PATENT DOCUMENTS

CN          103440877 A      12/2013
CN          103493464 A       1/2014
(Continued)

OTHER PUBLICATIONS

International Search Report and Written Opinion dated Feb. 15, 2016 from corresponding International Patent Application No. PCT/EP2015/073265.

*Primary Examiner* — Tung T Vo (57) ABSTRACT

The invention relates to the transmission of multimedia data, which is to be output, from a computer device to a vehicle multimedia device. The vehicle multimedia device has a control device which is designed to determine a piece of vehicle status information in order to transmit said information to the computer device. On the basis of the vehicle status information, the computer device generates release data which determines to what extent the multimedia data is to be output. The computer device transmits the multimedia data and the release data to the vehicle multimedia device, which multimedia device outputs, by means of an output device, the maximum multimedia data to the extent defined by the release data.

19 Claims, 2 Drawing Sheets

(51) Int. Cl.
*H04W 4/48* (2018.01)
*H04L 29/08* (2006.01)
*B60K 37/06* (2006.01)
*G06F 21/74* (2013.01)
*G08G 1/0962* (2006.01)
*H04W 4/44* (2018.01)
*H04W 4/46* (2018.01)
*H04W 4/02* (2018.01)
*H04M 1/725* (2006.01)

(52) U.S. Cl.
CPC ......... *G08G 1/09626* (2013.01); *H04L 67/12* (2013.01); *H04W 4/48* (2018.02); *B60K 2370/152* (2019.05); *B60K 2370/195* (2019.05); *B60K 2370/197* (2019.05); *B60K 2370/52* (2019.05); *B60K 2370/55* (2019.05); *B60K 2370/573* (2019.05); *B60K 2370/589* (2019.05); *G06F 2221/2141* (2013.01); *G06F 2221/2147* (2013.01); *H04M 1/7253* (2013.01); *H04W 4/027* (2013.01); *H04W 4/44* (2018.02); *H04W 4/46* (2018.02)

(58) Field of Classification Search
CPC .......... H01M 2300/0028; C07C 211/63; Y02E 60/13; C07D 211/00; C07D 209/04; C07D 207/00; C01B 35/063; B60K 35/00; B60K 37/06; B60K 2370/195; B60K 2370/55; B60K 2370/573; B60K 2370/197; B60K 2370/589; B60K 2370/152; B60K 2370/52; G06F 21/74; G06F 21/64; G06F 2221/2147; G06F 2221/2141; H04W 4/48; H04W 4/027; H04W 4/46; H04W 4/44; H04W 4/046; G08G 1/09626; H04L 67/12; H04M 1/7253

USPC ........................................................ 348/148
See application file for complete search history.

(56) References Cited

U.S. PATENT DOCUMENTS

| | | | | |
|---|---|---|---|---|
| 2008/0270093 | A1* | 10/2008 | Kreitzer | G06F 17/50 703/9 |
| 2009/0080673 | A1* | 3/2009 | Laurent | H03G 3/32 381/86 |
| 2010/0131642 | A1* | 5/2010 | Chalikouras | G06Q 30/02 709/224 |
| 2011/0093165 | A1* | 4/2011 | Miller | B60R 22/48 701/36 |
| 2011/0200193 | A1* | 8/2011 | Blitz | H04L 9/3271 380/277 |
| 2013/0106750 | A1 | 5/2013 | Kurosawa | |
| 2013/0337747 | A1* | 12/2013 | Lee | G06F 3/0488 455/41.2 |
| 2014/0038669 | A1 | 2/2014 | Shimizu et al. | |
| 2014/0189528 | A1* | 7/2014 | Chang | H04M 1/6075 715/752 |
| 2015/0242015 | A1* | 8/2015 | Cho | G06F 3/044 345/174 |
| 2015/0262435 | A1* | 9/2015 | Delong | G07C 5/0816 340/439 |

FOREIGN PATENT DOCUMENTS

| | | |
|---|---|---|
| CN | 103634205 A | 3/2014 |
| CN | 103780702 A | 5/2014 |
| CN | 103973887 A | 8/2014 |
| CN | 104079664 A | 10/2014 |
| WO | 2012/156029 A1 | 11/2012 |

* cited by examiner

VEHICLE MULTIMEDIA DEVICE

BACKGROUND

The invention relates to the output of multimedia data from a computer device coupled to a vehicle multimedia device, by means of the vehicle multimedia device. In particular, the invention relates to a vehicle multimedia device, a vehicle multimedia system, a method, a program element, a computer readable medium and a portable terminal.

Modern motor vehicles, particularly automobiles, may be equipped with vehicle multimedia devices that can output different types of multimedia data. By way of example, such vehicle multimedia devices can undertake functions of a car radio, of a navigation device, of a CD player, of an internet browser and other functions. Typically, such a vehicle multimedia device is controlled by means of what is known as a head unit, which may be integrated in a central console of the vehicle.

Further, there is the option for a computation unit, for example a portable terminal, to be coupled to the vehicle multimedia device. In this case, multimedia data can be output from the computation unit coupled to the vehicle multimedia device, by means of the vehicle multimedia device. By way of example, a screen content of a smartphone coupled to the vehicle multimedia device can be reproduced or displayed on the head unit of the vehicle multimedia device.

BRIEF SUMMARY

It is an object of the invention to increase safety in road traffic.

This object is achieved by the subjects of the independent and coordinate claims. Developments and embodiments can be taken from the dependent claims, the description below and the figures.

A first aspect of the invention relates to a vehicle multimedia device that has an output device for outputting multimedia data and also a control device for controlling the output device. Further, the control device is designed to determine a piece of vehicle status information and to transmit the vehicle status information to a computer device coupled to the vehicle multimedia device. The control device is further designed to receive from the computer device multimedia data that are to be output and clearance data that stipulate the scope in which the multimedia data that are to be output can be output. Moreover, the control device is designed to output, by means of the output device, the multimedia data that are to be output at most in the scope stipulated by the clearance data.

Within the context of the invention, vehicle multimedia device can also be understood to mean what is known as an infotainment system. The output device can have a screen and/or a loudspeaker, for example. By way of example, the screen may be installed in what is known as a head unit of the vehicle multimedia device, which may be integrated in a central console of the vehicle. By way of example, the screen of the output device may be a touchscreen that allows the user to make inputs. The multimedia data can define one or more images that are to be output and/or one or more sounds that are to be output, for example. The control device can denote a processor of the vehicle multimedia device, for example, and may further be designed to control the vehicle multimedia device. By way of example, the control device may be implemented as a system on chip (SoC).

The vehicle status information can be ascertained by means of the vehicle sensors, for example, and transmitted to the control device. Further, the vehicle status information can also be ascertained by means of car-to-car communication (C2C) and/or by means of car-to-infrastructure communication (C2I). The vehicle status information can contain a piece of information about what attention the driver needs to devote to the traffic. By way of example, the driver needs to devote more attention to the traffic when traffic density is higher.

The computer device may be a portable terminal or a mobile device, for example. By way of example, the computer device may be a smartphone, a tablet, a television, an MP3 player or a portable computer. Furthermore, the computer device can be coupled to the vehicle multimedia device. This can be understood to mean that the vehicle multimedia device and the computer device can be connected to one another for the purpose of data interchange. By way of example, the computer device and the vehicle multimedia device can be coupled to one another for the purpose of providing bidirectional communication. The coupling between computer device and the vehicle multimedia system can be provided by cable and/or by radio. By way of example, the vehicle multimedia device and the computer device may be coupled to one another by USB, Bluetooth, WLAN, HDMI, MHL (Mobile High Definition Link), MirrorLink, MiraCast or another connection.

The multimedia data that are to be output and that the control device can receive can be produced by the computer device. By way of example, the multimedia data that are to be output are multimedia data that define an image that is output on the computer device and is intended to be output on the output device of the vehicle multimedia device at the same time. By way of example, the multimedia data can define an image of a user interface of an active application of the computer unit.

The clearance data can be transmitted to the vehicle multimedia device and received from the control device together with the multimedia data that are to be output and/or by means of the same data connection. Further, the clearance data can also be transmitted and received independently of the multimedia data that are to be output, or can be transmitted and received by means of different data connections. By way of example, there may be two different connections between the computer device and the vehicle multimedia device, so that one connection can be used to transmit the multimedia data that are to be output and the other connection can be used to transmit the clearance data.

The scope in which the multimedia data that are to be output can be output can define whether the multimedia data that are to be output can be output in the first place, for example. Further, the scope can also define an update rate or a maximum update rate at which the output of the multimedia data by the output device can be updated. By way of example, this is an update rate for an image that is output by the output device. Further, the scope can also stipulate that the multimedia data that define an image that is to be output are toned down in color. Moreover, the scope can also stipulate that the multimedia data that define sounds that are to be output cannot exceed a particular volume. The scope can also define the opportunities for the user to interact with an image displayed on a screen of the output device. By way of example, buttons can be deactivated upward of a certain speed.

The computer device may further be designed to produce the multimedia data that are to be output. By way of example, the multimedia data define, inter alia, an image that is presented on the screen of the computer device. Moreover, the control device may be designed to take the vehicle status information as a basis for producing the clearance data. By way of example, the clearance data can be produced on the basis of the vehicle status information. By way of example, the clearance data can specify that certain applications are no longer presented, or are presented only to a limited degree, on a screen of the output device upward of a certain speed of the vehicle. Within the context of the invention, this can be understood to mean that an image of a user interface of an application that is active on the computer device is no longer presented or is presented only to a limited degree.

In other words, the invention can relate to a vehicle multimedia system or an infotainment system in which content that is to be output from a device coupled to the vehicle multimedia device or from a coupled computer device can be output on the basis of the current vehicle state, the surroundings detected by the vehicle and the destination. By way of example, in the case of parked vehicles, all content and applications of the device coupled to the vehicle multimedia device can be made available. At a certain speed of travel, certain content may then no longer be available. Further, it is also possible for certain content to be proposed on the basis of the situation, said content then being retrievable quickly by the driver.

This can be implemented by means of bidirectional communication between a head unit (HU) of the vehicle multimedia device and the portable terminal, for example. In this case, the head unit (HU) can transmit a vehicle status (FZGS), for example a speed, a tank content or another piece of status information, to the portable terminal (PD) coupled to the head unit. The portable terminal (PD) can transmit a piece of information concerning whether the transmitted screen content can be presented on the head unit and manual remote operation of or audio output from the portable terminal can take place, that is to say a clearance message (FMSG), to the head unit (HU). Alternatively, instead of the screen output being disabled, it is also possible for clearance to be provided for a presentation that is merely toned down in color or grayed out, which is less distracting, or for the rate of change of the screen output, for example once every 5 seconds, or the maximum volume of the audio output to be limited.

This allows portable terminals to be integrated into the vehicle in a manner matched to the current driving situation. The clearance signals based on the vehicle status allow a finely gradated selection of clearances and limitations for the use of applications on a portable terminal by the driver.

In other words, a core concept of the invention can be regarded as being that a transmission of multimedia data from a computer device to a vehicle multimedia device is provided, so that the multimedia data can be output on the basis of the vehicle status. For this purpose, the vehicle multimedia device may be designed to determine a piece of vehicle status information and to transmit it to the computer device. The computer device can take this received vehicle status information as a basis for producing appropriate clearance data that define the scope of the output of the multimedia data by the vehicle multimedia device.

In this manner, the multimedia data of the coupled computer device can be output such that they do not distract the driver too much on the basis of the current driving situation, which means that safety in road traffic can be increased overall.

According to an exemplary embodiment of the invention, the output device is a screen. Further, the multimedia data sent by the computer device coupled to the vehicle multimedia device define an image that is to be presented on the screen.

This can also be understood to mean that the multimedia data contain video data. By way of example, the computer unit can be connected to one another by a mechanism such as MHL (Mobile High Definition Link), MirrorLink and MiraCast. Such mechanisms can be used to couple portable terminals and other devices to a vehicle multimedia device, so that the screen content of the coupled device can be transmitted to the vehicle multimedia device and can be displayed thereon. However, this does not preclude audio data from also being able to be transmitted and output in addition. By way of example, the multimedia data can define an image of a user interface of an active application of the computer unit. In this way, images and/or videos can be presented on a screen of the vehicle multimedia device by the computer unit such that the driver is not distracted from the traffic too much.

According to an exemplary embodiment of the invention, the control device is designed to output, by means of the output device, for a predefined period after the clearance data are received, the multimedia data that are to be output at most in the scope stipulated by the clearance data. Further, the control device is designed to no longer output the multimedia data that are to be output after the predefined period has elapsed if no new clearance data have been received between the clearance data being received and the predefined period elapsing.

In other words, the clearance data can be transmitted to the vehicle multimedia device and/or received by the control device of the vehicle multimedia device cyclically. In the event of the control device not receiving the clearance data for a certain period or for the predefined period, output of the multimedia data can be stopped or limited.

The predefined period may be in the range between 1 and 5 seconds, for example. The predefined period may be defined to be sufficiently large for there to be no significant additional loading of the data connection between the control device and the computer device. Further, the predefined period may also be defined to be sufficiently short for there to be no protracted distraction of the driver in the event of a malfunction in or manipulation of the computer device.

In this manner, the scope of the output of the multimedia data can be dynamically matched to the driving situation.

According to a further exemplary embodiment of the invention, the control device is designed to receive encrypted and/or signed clearance data from the coupled computer device. Further, the control device is designed to decrypt the clearance data and to check a signature of the clearance data and to output the multimedia data only if the clearance data have been successfully decrypted and if the signature thereof has been successfully checked.

In this manner, manipulations of the clearance data can be prevented.

According to a further exemplary embodiment of the invention, the vehicle status information is selected from the group consisting of a speed of the vehicle, a tank content of the vehicle, a traffic density in the vehicle surroundings, a piece of information pertaining to light conditions, a complexity of a vehicle path ahead, a number of turns in the vehicle path ahead, traffic rules to be taken into consideration by the vehicle, and any combination of these.

From this information, the control device can obtain a piece of information about what attention is demanded of the driver for the present driving situation. Further, said information may be current information. This information can be ascertained by vehicle sensors, by means of car-to-car communication (C2C) and/or by means of car-to-infrastructure communication (C2I), for example.

A further aspect of the invention relates to a vehicle multimedia system that has a vehicle multimedia device described within the context of the present invention and a computer device. Further, the vehicle multimedia device and the computer device are couplable to one another. Moreover, the computer device is designed to receive the vehicle status information of the vehicle multimedia device. The computer device is further designed to produce the multimedia data that are to be output and to take the vehicle status information as a basis for producing the clearance data. The computer device is moreover designed to transmit the multimedia data that are to be output and the vehicle status information to the vehicle multimedia device.

According to an exemplary embodiment of the invention, the computer device has a memory unit, wherein the memory unit stores a set of rules in which, for different vehicle status information and for different types of multimedia data, there is a definition of the scope in which the different types of multimedia data can each be output on the basis of a piece of vehicle status information.

Various types of multimedia data may be audio data, image data, video data and/or application data, for example. The application data can comprise data of an application executed on the computer unit, for example. By way of example, these data can define an image of a user interface. The set of rules can contain a definition of whether or not an application can be output for a particular piece of vehicle status information, for example. Further, there may also be a definition of whether or not a particular function of an application and/or an application component can be output for a particular piece of vehicle status information.

By way of example, the set of rules may be stored in the memory unit in the form of a clearance table. In other words, the set of rules may contain a definition of how a particular type of multimedia data can be output on the basis of a piece of vehicle status information. By way of example, a respective application executed on the computer unit can produce its own type of multimedia data that need to be output by means of the output device of the vehicle multimedia device.

This set of rules may be stored in the computer unit in the form of an application, for example. Further, the set of rules may be updatable or sometimes editable.

In other words, rules for the clearances can be stipulated in a clearance table (FRULS) that contains, for each known application (Ai), a signature that can be used to explicitly establish which application program is involved or whether an unknown application is involved. The applications A1 to An can each be allocated the clearance data for visual and audio outputs and the operator control options on the basis of the vehicle status (FZGS), for example the speed, the current traffic density, the traffic route complexity in the surroundings of the vehicle, the roadway properties (derived from outside temperature, ABS, ASR, etc.) and/or the current geographical position. Further, the clearance table (FRULS) or the set of rules stored in the memory unit may be updatable and protected against manipulation by means of encryption. So that an unauthorized clearance table or an unauthorized set of rules cannot be produced, the clearance table and the set of rules can be signed by an authorized service (SIG_OEM) that is checked in a software component of the computer device (PD_CLT) using the public signatures of the authorized service (SIG_OEM).

The authorization can also be effected automatically via a data communication center using a computer for an authorization service, particularly also via a mobile radio data interface of the computer unit or of the portable terminal using a server for the authorization service, which server can be reached on the internet. Further, this protected (i.e. authenticated, authorized and/or encrypted) connection can be used to transmit a new version of the set of rules to the portable terminal, which set of rules changes or extends the existing set of rules. This can relate both to the clearance table (FRULS) and to the rule base (APRULS) defined below for clearances for applications and handling of vehicle events.

Further, the clearance table or the set of rules stored in the memory unit can also be stipulated by the end user using the user interface of the portable terminal or of the computer unit or of the head unit. To this end, the end user can first of all be notified, by the user interface, of the legal advice, according to which use of an application while driving is prohibited or cannot or should not take place. The end user can then select the applications of the portable terminal that he wishes to use on the head unit. He can use the user interface to assign to these the events regarding when clearance for an application needs to be withdrawn or granted. These clearance rules can then be permanently stored in the clearance table (FRULS) or the set of rules.

As an extension, a collection of sets of rules (FRULSi) may be stored in the terminal, in which sets of rules are respectively associated with individual regions between which it is possible to automatically change over depending on the local legal stipulations. To this end, a software component (PD_CLT) of the portable terminal can take the geographical position and a map base (MAP) and compute the region governing the legal norm, for example the current federal state, or can obtain this directly from the head unit software component (HU_SVR) and select the respective appropriate set of rules (FRULS) from the collection of sets of rules (FRULSi) and inform the user about the switch of the set of rules that has taken place, for example by means of a display or voice output. If a region cannot be ascertained beyond doubt, it is possible to resort to a preset set of rules that grants the clearances in such a restrictive manner that they comply with the legal norms in all states in question.

The smartphone component (PD_CLT) could also provide the user with a display of an overview of the applications that have all or certain clearances in the current situation. In this case, the applications could be highlighted or put into the presentation for preferred applications that would be useful in the current situation. By way of example, these may be a filling station app for an almost empty tank or, if the navigation of the head unit plans a route to the airport, an application for presenting departure or arrival times. To implement these instances of application, the software component of the head unit (HU_SVR) can also transmit in the vehicle status (FZGS) the destinations of the route planning of a navigation integrated in the head unit or can use an application interface to access the destination data of the active navigation application in the portable terminal (PD).

To implement this functionality, the software component (PD_CLT) of the portable terminal can have a further rule base (APRULS) that determines which of the started applications (Ai) is fetched to the foreground, that is to say is operable and visible, or are displayed to the user for selection. In the rule base, (APRULS), it is possible to take the vehicle status (FZGS) as a basis for formulating events regarding when a started application (Ai) needs to be made visible or operable. Optionally, the user can determine the application rule base (APRULS) himself using a user interface of the software component of the portable terminal (PD_CLT), so that only events that are not inconsistent with the clearances for the display or operability of the application are permitted.

By way of example, the rule base (APRULS) can have the following rules:
1: Vehicle speed v=0: media player app
2: Vehicle speed v>10 km/h: nay app
3: Tank content Q<51: refueling app
4: Traffic density>50%: congestion app If the vehicle is stationary, rule 1 is activated, so that the media player app comes to the foreground and a video is played while the vehicle is stationary. When the vehicle exceeds a speed of 10 km/h, rule 2 is activated and the nay app with a map presentation of the surroundings comes to the foreground. When the tank content falls below the limit defined above, rule 3 is activated and the refueling app comes to the foreground, presenting a list of nearby filling stations. In heavy traffic, rule 4 is activated and the congestion app comes to the foreground, presenting a list of current congestion with further advice.

According to a further exemplary embodiment of the invention, the computer device is a portable terminal, the computer device having a screen. Further, the multimedia data define an image that is presented on the screen of the computer device and that can be reproduced on a screen of the output device of the vehicle multimedia device.

In other words, the image defined by the multimedia data can be reproduced on a screen of the portable terminal and on a screen of the vehicle multimedia device at the same time.

A further aspect of the invention relates to a vehicle having a vehicle multimedia device that is described within the context of the invention or having a vehicle multimedia system that is described within the context of the invention.

By way of example, the vehicle may be a motor vehicle, a car, an automobile, a truck or a bus, or may be a commercial vehicle.

A further aspect of the invention relates to a method for transmitting multimedia data that are to be output by means of an output device of a vehicle multimedia device from a computer device to the vehicle multimedia device coupled to the computer device. The method has the steps of reception of a piece of vehicle status information from the vehicle multimedia device by the computer device and of sending of multimedia data that are to be output, to the vehicle multimedia device. Further, the method has the step of sending of clearance data that stipulate the scope in which the multimedia data that are to be output can be output, to the vehicle multimedia device.

This method can be performed by a processor of a portable terminal, for example. Further, the method can also have steps that are described in connection with the computer device described within the context of the present invention. Moreover, the steps defined in the method can be performed in the specified order, in a different order or in parallel with one another.

A further aspect of the invention relates to a program element that, when executed on a processor of a computer device, instructs the processor to perform the method described within the context of the invention.

In this case, the program element may also be a program update that enables an already existing program element to perform the defined steps.

A further aspect of the invention relates to a computer readable medium that stores a program element that, when executed on a processor of a computer device, instructs the processor to perform the method described within the context of the invention.

The computer readable medium may be, by way of example, a data storage medium, such as a CD, a USB stick or a hard disk. Further, the computer readable medium can also refer to a memory unit that is installed in a portable terminal or in a computer unit and on which the program element is stored.

A further aspect of the invention relates to a portable terminal having a computer readable medium described within the context of the invention.

The portable terminal may be a smartphone, a tablet or a portable computer or notebook, for example. The computer readable medium may be a memory unit integrated in the portable terminal, for example.

An exemplary embodiment of the invention relates to a portable terminal that has the set of rules described within the context of the invention. The portable terminal is designed to use a connection to an authorization service to change or extend the set of rules. The connection to the authorization service may be protected, e.g. may have an authenticated, authorized and/or encrypted data connection.

Further features, advantages and opportunities for application of the invention will emerge from the description below of the exemplary embodiments and figures. In this case, all described and/or graphically depicted features by themselves and in arbitrary combination form the subject matter of the invention even independently of their compilation in the individual claims or the back-references thereof.

DETAILED DESCRIPTION

In this case, the figures are depicted schematically and not as true to scale. Where the same reference symbols are indicated in different figures in the description below, these denote like or similar elements. Like or similar elements may also be denoted by different reference symbols, however.

Figure 1:
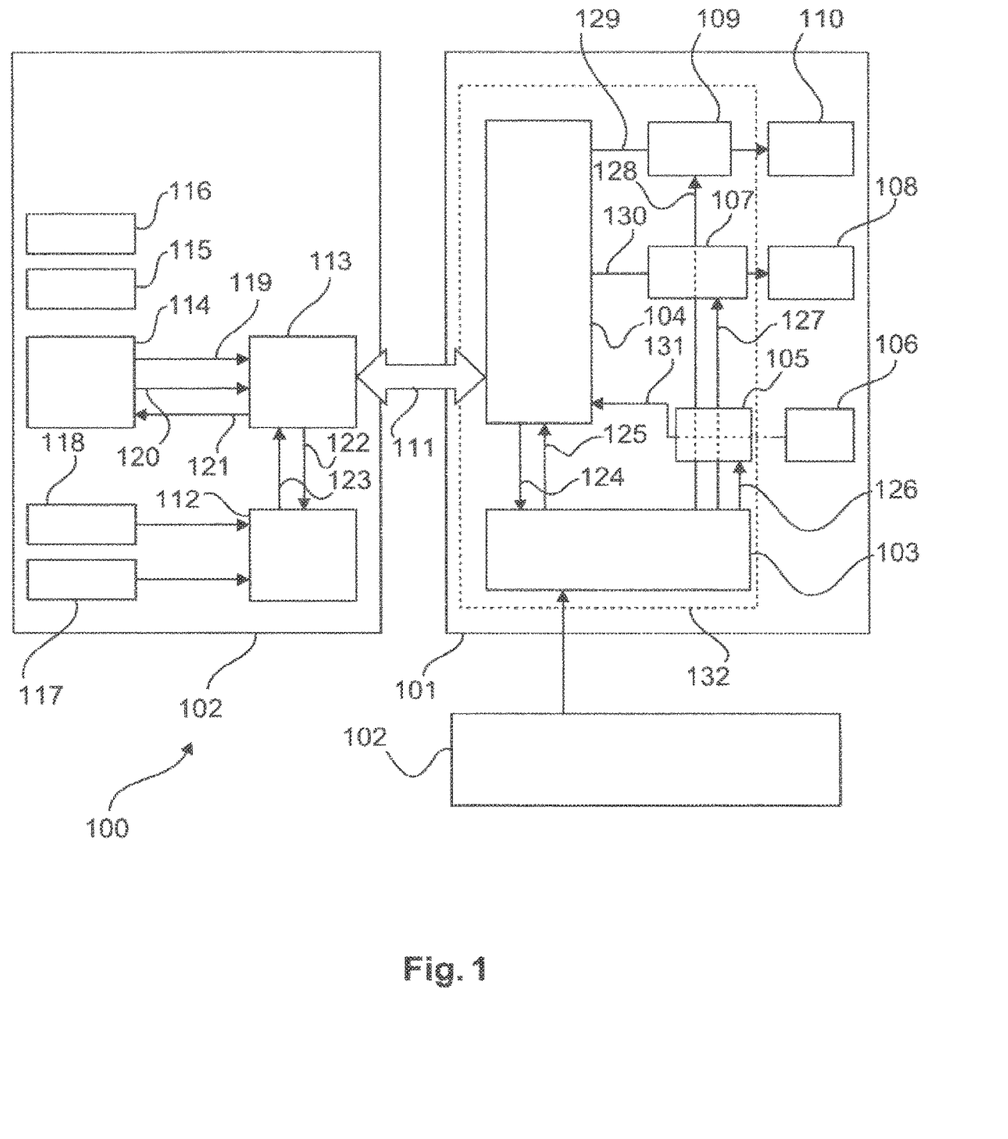
FIG. 1 shows a vehicle multimedia system according to an exemplary embodiment of the invention.

FIG. 1 depicts a vehicle multimedia system 100 according to an exemplary embodiment of the invention, which vehicle multimedia system has a head unit (HU) 101 of a vehicle multimedia device and also a portable terminal (PD) 102 that is coupled to the head unit (HU) 101. In this case, the portable terminal 102 corresponds to the computer unit described within the context of the invention.

The head unit 101 has a software component (HU_SVR) 103 that, inter alia, can access the vehicle sensors 102 and, by way of example, can ascertain the outside temperature, the tank content, speed or other parameters. Further, the software component (HU_SVR) 103 is designed to transmit video data 128 to a screen control unit (DISP CTRL) 109, which can in turn transmit the video data to the screen 110. The software component 103 is furthermore designed to transmit audio data 127 to an audio control unit (AUDIO CTRL) 107, which can transmit the audio data to an audio output 108. Furthermore, the software component 103 is also designed to transmit user interface data 126 to a user interface control unit (USER CTRL), which transmits the user interface data to a user interface 106. By way of example, the user interface data 126 can stipulate what inputs the user needs to make using the user interface 106.

Further, the head unit 101 has a data interface 104 (DE-MUX, MUX, BUS, HU) that the head unit 101 can use to communicate with other devices coupled to the head unit, for example with the portable terminal 102. By way of example, the software component 103 can transmit a piece of vehicle status information (FZGS) 125 to the data interface 104. Further, the user interface control unit 105 can forward a user input 131 made on the user interface 106 to the data interface 104. Further, the video control unit 109 can forward video data 129 that are to be output from the data interface 104 to the screen 110. Similarly, the audio control unit 107 can forward audio data 130 that are to be output from the data interface 104 to the audio output 108. The data interface 104 can further forward clearance data (FMSG) 124 to the software component 103. The components 103, 104, 105, 107 and 108 and the connections thereof are part of the control device 132 of the vehicle multimedia device.

The portable terminal (PD) 102 has a software component (PD_CLT) 112. The software component 112 of the portable terminal 102 can access the clearance table (FPRULS) 117, the clearance table (FPRULS) corresponding to the set of rules described within the context of the invention. Further, the software component 112 can also access a further rule base (APRULS) 118. The portable terminal 102 further has a data interface 113 (MUX, DEMUX, BUS, PD) by means of which the portable terminal is coupled to the data interface 104 of the head unit 101. Further, the portable terminal 102 has inactive applications (App A2) 115 and (App A3) 116. Moreover, the portable terminal 102 has an active application (App AVU) 114. The active application 114 transmits to the data interface 113 video data 119 that are to be reproduced and audio data 120 that are to be output, so that they can be transmitted to the data interface 104 of the head unit 101 and can be output by means of the screen 110 and/or the audio output 108. Further, the data interface 113 of the portable device 102 can also receive user inputs 131 from the data interface 104 of the head unit 101 and forward corresponding user inputs 121 to the active application 114.

The connection 111 between the interface 113 of the portable terminal 102 and the interface 104 of the head unit 101 can be made by USB, Bluetooth or WLAN, for example.

Reproduction of audio and video data by means of the audio output 108 and the screen 110 of the head unit 101 can take place as follows. The software component 103 of the head unit 101 receives vehicle status information from the vehicle sensors 102. This vehicle status information 125 is transmitted to the data interface 104 of the head unit 101 and subsequently to the data interface 113 of the portable terminal 102. The data interface 113 of the portable terminal 102 transmits the vehicle status information 122 to the software component 112 of the portable terminal 102. On the basis of this vehicle status information 122, the software component 112 can read rules for the clearance from the clearance table 117 and produce clearance data or a clearance message (FMSG) and transmit the latter 123 to the data interface 113 of the portable terminal 102. The data interface 113 transmits the video data and audio data that are to be output and also the clearance data to the interface 104 of the head unit 101 by means of the connection 111. Subsequently, the clearance data 124 are transmitted to the software component 103 of the head unit 101, which transmits video data 128, audio data 127 and/or user interface control data 126 to the units 109, 107 and 105. The screen control unit 109 then outputs the video data 128 by means of the screen 110. Accordingly, the audio control unit 107 outputs the audio data 127 by means of the audio output. The user interface control unit 105 takes the user interface control data 126 as a basis for stipulating the input options by means of the user interface 106.

By way of example, the following exemplary case can occur, in which a car driver gets into his parked car and couples his smartphone to the head unit 101 by means of MHL, for example, and starts the smartphone software. This software then uses Bluetooth, WLAN or the MHL data channel to set up a connection to the head unit 101 and requests the vehicle status 102. Since the vehicle is parked, the smartphone use via the input/output units of the head unit is not restricted. The smartphone cyclically sends the clearance signal for unrestricted display presentation to the head unit, which subsequently displays the video image received by MHL on the display in the central console.

The car driver decides to play a video film on the smartphone 102 and therefore starts the media player app. Reproduction takes place via the display 110 and the loudspeakers 108 of the vehicle. Additionally, he starts applications that are intended to assist him in driving: navigation (nay app), refueling assistant (refueling app) and a telematics application for bypassing congestion (congestion app). The driver selects the media player app again in order to watch the video. The car driver then starts the engine and drives off. The changed vehicle status with a speed of travel above the limit speed is communicated to the smartphone 102 by the head unit 101. The software component 112 on the smartphone 102 establishes that reproduction of a video is no longer permitted in the new situation and no longer sends a clearance signal to the head unit 101. The latter deactivates video output on the vehicle display 110 in order to prevent driver distraction. The vehicle travels faster than a limit speed, for example 10 km/h, and the information from the head unit software component 103 (HU_SVR) is sent to the software component 112 of the portable terminal (PD_CLT). On the basis of the rule in the rule base (APRULS) 118, the navigation app is fetched to the foreground by the software component (PD_CLT) 112 and displayed on the head unit.

Figure 2:
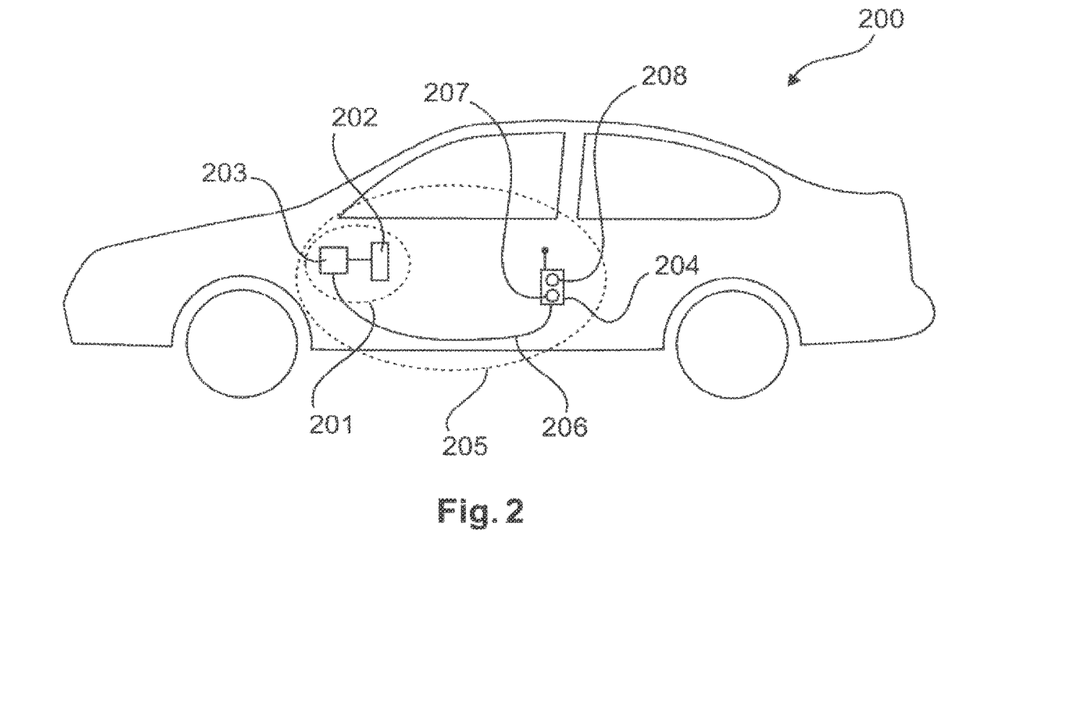
FIG. 2 shows a vehicle having a vehicle multimedia system according to an exemplary embodiment of the invention.

FIG. 2 depicts a vehicle 200 having a vehicle multimedia system 205, described within the context of the invention, according to an exemplary embodiment of the invention. In this case, the vehicle multimedia system 205 has a vehicle multimedia device 201 and a computer unit 204. The vehicle multimedia device further comprises an output device 202 and a control device 203. The computer device is coupled to the vehicle multimedia device or to the control device 203 by means of a data connection 206. Further, the computer unit 204 has a screen 208 and a memory unit 207 that stores the sets of rules described within the context of the invention.

Figure 3:
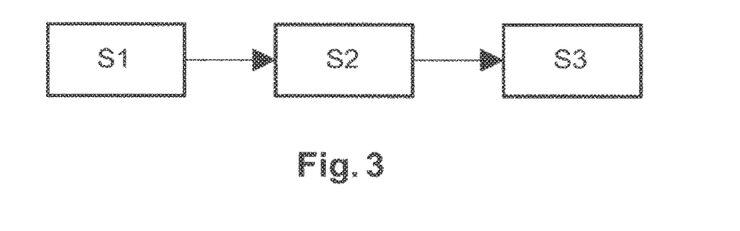
FIG. 3 shows a flowchart for a method according to an exemplary embodiment of the invention.

FIG. 3 depicts a flowchart for a method for transmitting multimedia data that are to be output by means of an output device of a vehicle multimedia device from a computer device to the vehicle multimedia device, coupled to the computer device, according to an exemplary embodiment of the invention. The method comprises the steps S1 of reception of a piece of vehicle status information from the vehicle multimedia device by the computer device and S2 sending of multimedia data that are to be output to the vehicle multimedia device. Further, the method comprises the step S3 of sending of clearance data that stipulate the scope in which the multimedia data that are to be output can be output, to the vehicle multimedia device.

It should be additionally be pointed out that "comprising" or "having" does not preclude other elements and "a" or "one" does not preclude a plurality. Further, it should be pointed out that features that have been described with reference to one of the above exemplary embodiments or embodiments can also be used in combination with other features of other exemplary embodiments or embodiments described above. Reference symbols in the claims should not be regarded as restrictions.

The invention claimed is:

1. A vehicle multimedia device, having:
   an output device for outputting multimedia data;
   a control device for controlling the output device;
   wherein the control device is designed to determine a piece of vehicle status information;
   wherein the control device is designed to send the vehicle status information to a computer device coupled to the vehicle multimedia device, wherein the computer device is designed to: produce the multimedia data that are to be output by the output device, take the vehicle status information as a basis for producing clearance data that stipulate the scope in which the multimedia data that are to be output can be output, and transmit the multimedia data, which are to be output within the scope of the clearance data, and the vehicle status information to the vehicle multimedia device;
   wherein the control device is designed to receive from the computer device the multimedia data that are to be output and the clearance data that stipulate the scope in which the multimedia data that are to be output can be output, wherein the clearance data stipulate that at least a portion of the multimedia data is no longer outputted above a predetermined speed of the vehicle;
   wherein the control device is designed to output, by means of the output device, the multimedia data that are to be output at most in the scope stipulated by the clearance data such that, above the predetermined speed of the vehicle, the at least a portion of the multimedia data is no longer outputted; and
   wherein the control device is designed to output, by means of the output device, for a predefined period after the clearance data are received, the multimedia data that are to be output at most in the scope stipulated by the clearance data; and
   wherein the control device is designed to no longer output the multimedia data that are to be output after the predefined period has elapsed when no new clearance data have been received between the clearance data being received and the predefined period elapsing.

2. The vehicle multimedia device as claimed in claim 1, wherein the output device is a screen and
   wherein the multimedia data sent by the computer device coupled to the vehicle multimedia device define an image that is to be reproduced on the screen.

3. The vehicle multimedia device as claimed in claim 1, wherein the control device is designed to receive encrypted and/or signed clearance data from the coupled computer device;
   wherein the control device is designed to decrypt the clearance data and to check a signature of the clearance data; and
   wherein the control device is designed to output the multimedia data only if the clearance data have been successfully decrypted and if the signature thereof has been successfully checked.

4. The vehicle multimedia device as claimed in claim 1, wherein the vehicle status information is selected from the group consisting of a speed of the vehicle, a tank content of the vehicle, a current traffic density in the vehicle surroundings, information pertaining to light conditions, a complexity of a vehicle path ahead, a number of turns in a vehicle path ahead, traffic rules to be taken into consideration by the vehicle and any combination of these.

5. A vehicle multimedia system, having:
   a vehicle multimedia device having:
      an output device for outputting multimedia data;
      a control device for controlling the output device;
      wherein the control device is designed to determine a piece of vehicle status information;
      wherein the control device is designed to send the vehicle status information to a computer device coupled to the vehicle multimedia device;
      wherein the control device is designed to receive from the computer device multimedia data that are to be output and clearance data that stipulate the scope in which the multimedia data that are to be output can be output, wherein the clearance data stipulate that at least a portion of the multimedia data is no longer outputted above a predetermined speed of the vehicle; and
      wherein the control device is designed to output, by means of the output device, the multimedia data that are to be output at most in the scope stipulated by the clearance data such that, above the predetermined speed of the vehicle, the at least a portion of the multimedia data is no longer outputted;
   a computer device;
   wherein the vehicle multimedia device and the computer device are couplable to one another;
   wherein the computer device is designed to receive the vehicle status information of the vehicle multimedia device;
   wherein the computer device is designed to produce the multimedia data that are to be output;
   wherein the computer device is designed to take the vehicle status information as a basis for producing the clearance data;
   wherein the computer device is designed to transmit the multimedia data that are to be output and the vehicle status information to the vehicle multimedia device;
   wherein the control device is designed to output, by means of the output device, for a predefined period after the clearance data are received, the multimedia data that are to be output at most in the scope stipulated by the clearance data; and
   wherein the control device is designed to no longer output the multimedia data that are to be output after the predefined period has elapsed when no new clearance data have been received between the clearance data being received and the predefined period elapsing.

6. The vehicle multimedia system as claimed in claim 5, wherein the computer device has a memory unit; and
   wherein the memory unit stores a set of rules in which, for different vehicle status information and for different types of multimedia data, there is a definition of the scope in which the different types of multimedia data can each be output on the basis of a piece of vehicle status information.

7. The vehicle multimedia system as claimed in claim 5, wherein the computer device is a portable device;
   wherein the computer device has a screen; and wherein the multimedia data define an image that is presented on the screen of the computer device and that is to be reproduced on a screen of the output device of the vehicle multimedia device.

8. A method for transmitting multimedia data that are to be output by means of an output device of a vehicle multimedia device from a computer device to the vehicle multimedia device coupled to the computer device, the method comprising:
receiving a piece of vehicle status information from the vehicle multimedia device by the computer device;
producing the multimedia data that are to be output by the output device;
taking the peice of vehicle status information as a basis for producing clearance data that stipulate the scope in which the multimedia data that are to be output can be output;
sending the multimedia data that are to be output within the scope of the clearance data, to the vehicle multimedia device; and
sending the clearance data that stipulate the scope in which the multimedia data that are to be output can be output, to the vehicle multimedia device, wherein the clearance data stipulate that at least a portion of the multimedia data is no longer outputted above a predetermined speed of the vehicle such that, above the predetermined speed of the vehicle, the at least a portion of the multimedia data is no longer outputted;
outputting, by means of the output device, for a predefined period after the clearance data are received, the multimedia data that are to be output at most in the scope stipulated by the clearance data; and
no longer outputting the multimedia data that are to be output after the predefined period has elapsed when no new clearance data have been received between the clearance data being received and the predefined period elapsing.

9. The vehicle multimedia device as claimed in claim 8, wherein the control device is designed to receive encrypted and/or signed clearance data from the coupled computer device; wherein the control device is designed to decrypt the clearance data and to check a signature of the clearance data; and wherein the control device is designed to output the multimedia data only if the clearance data have been successfully decrypted and if the signature thereof has been successfully checked.

10. The vehicle multimedia device as claimed in claim 9, wherein the vehicle status information is selected from the group consisting of a speed of the vehicle, a tank content of the vehicle, a current traffic density in the vehicle surroundings, information pertaining to light conditions, a complexity of a vehicle path ahead, a number of turns in a vehicle path ahead, traffic rules to be taken into consideration by the vehicle and any combination of these.

11. The vehicle multimedia system as claimed in claim 6, wherein the computer device is a portable device;
wherein the computer device has a screen; and
wherein the multimedia data define an image that is presented on the screen of the computer device and that is to be reproduced on a screen of the output device of the vehicle multimedia device.

12. The vehicle multimedia device of claim 1, wherein the clearance data stipulate that that the multimedia data that define an image that is to be output are toned down in color.

13. The vehicle multimedia device of claim 1, wherein the clearance data stipulate that the at least a portion of the multimedia data that is no longer outputted above a predetermined speed of the vehicle comprises user-interface buttons.

14. The vehicle multimedia device of claim 1, wherein the clearance data stipulate that the at least a portion of the multimedia data that is no longer outputted above a predetermined speed of the vehicle comprises an image of a user interface of an application that is active on the computer device.

15. The vehicle multimedia device of claim 1, wherein the computer device comprises a memory unit that stores a set of rules in which, for different vehicle status information and for different types of multimedia data, there is a definition of the scope in which the different types of multimedia data can each be output on the basis of a piece of vehicle status information.

16. The vehicle multimedia system of claim 5, wherein the clearance data stipulate that that the multimedia data that define an image that is to be output are toned down in color.

17. The vehicle multimedia system of claim 5, wherein the clearance data stipulate that the at least a portion of the multimedia data that is no longer outputted above a predetermined speed of the vehicle comprises user-interface buttons.

18. The vehicle multimedia system of claim 5, wherein the clearance data stipulate that the at least a portion of the multimedia data that is no longer outputted above a predetermined speed of the vehicle comprises an image of a user interface of an application that is active on the computer device.

19. The vehicle multimedia system of claim 5, wherein the computer device comprises a memory unit that stores a set of rules in which, for different vehicle status information and for different types of multimedia data, there is a definition of the scope in which the different types of multimedia data can each be output on the basis of a piece of vehicle status information.

* * * * *